DONOVAN C. DAVIS,
LOUIS A. ULE,
JOHN R. STOLTZ,
INVENTORS

BY

ATTORNEY.

Feb. 5, 1963    D. C. DAVIS ETAL    3,076,940

FREQUENCY DISCRIMINATOR

Filed Jan. 29, 1957    3 Sheets-Sheet 2

DONOVAN C. DAVIS,
LOUIS A. ULE,
JOHN R. STOLTZ,
INVENTORS

BY [signature]
ATTORNEY.

Feb. 5, 1963 D. C. DAVIS ETAL 3,076,940

FREQUENCY DISCRIMINATOR

Filed Jan. 29, 1957 3 Sheets-Sheet 3

DONOVAN C. DAVIS,
LOUIS A. ULE,
JOHN R. STOLTZ,
INVENTORS

BY [signature]

ATTORNEY.

United States Patent Office 3,076,940

Patented Feb. 5, 1963

3,076,940
FREQUENCY DISCRIMINATOR

Donovan C. Davis, Pasadena, Louis A. Ule, Alhambra, and John R. Stoltz, Los Angeles, Calif., assignors to Gilfillan Bros., Inc., Los Angeles, Calif., a corporation of California Filed Jan. 29, 1957, Ser. No. 637,046
10 Claims. (Cl. 329—140)

This invention relates to devices for producing direct-current voltages having amplitudes and algebraic signs which are functions of the difference between the frequency of an input signal and a predetermined frequency, and more particularly to discriminators having unambiguous responses.

The word "unambiguous" as used above refers to the operating characteristic of a frequency discriminator which has only one "crossover," i.e. only one frequency at which its output is exactly equal to zero.

All present day frequency discriminators generally employ two bandpass filters and for this reason very often have several crossovers in continuous wave (CW) operation as a result of any very slight misalignment of the filters. This effect is due to the fact that differencing is performed, not of small voltages, but of voltages which are large and nearly equal at frequencies far removed from the principal or "designed" crossover, i.e. the crossover at which the discriminator is designed to operate.

In pulse operation, these same discriminators have an even more unreliable response because additional crossovers are produced. Additional crossovers are produced because of the scallop-shaped power spectrum of pulse modulated radio frequency (RF) signals. When the frequency spectrum of the pulse to be passed through a discriminator has a width which is of the same order as that of the pass band of the discriminator, an anomalous behavior is presented. Specifically, if the response of the discriminator to pulses of short duration is observed as a function of the center frequency of the pulse, several crossover points may be found.

Present day frequency discriminators therefore generally have several crossovers, and for this reason, have several disadvantages and particularly when employed in servomechanisms. For example, when they are employed as components of automatic frequency control (AFC) circuits, this type of electronic servo may "home" on a crossover frequency other than the desired oscillation frequency of an associated oscillator.

The present invention overcomes these and other disadvantages of the prior art by providing a frequency discriminator which has only one crossover. This discriminator comprises a high-pass filter for attenuating an input signal substantially only when it has a frequency below a predetermined frequency, a low-pass filter for attenuating the input signal substantially only when it has a frequency above the predetermined frequency, and means for rectifying the outputs of each of the filters to produce a direct-current voltage having a predetermined polarity when the input signal has a frequency above a predetermined frequency, and to produce a direct-current voltage having a polarity opposite the predetermined polarity when the input signal has a frequency below the predetermined frequency. Although the output of each filter may be substantially constant over a wide range of frequencies, the discriminator has only one true crossover existing at its "designed" crossover.

By using a special feature of the invention, the sensitivity of this discriminator at its crossover may be increased to a relatively high value. This is done in accordance with the invention by terminating each of the filters in an impedance substantially greater than the corresponding characteristic impedance of each. This may also be effected by using intermediate filters having impedances respectively greater than that of the source impedance to each. However, it must be remembered that the filter cannot be a bandpass filter of a rather limited bandwith if the discriminator is to be employed in pulse operation with pulses having relatively small time widths.

It is therefore an object of the invention to provide a frequency discriminator having a single and true designed crossover.

It is another object of the invention to provide a sensitive frequency discriminator capable of producing a reliable response over an extremely large band of frequencies.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

Figure 1:
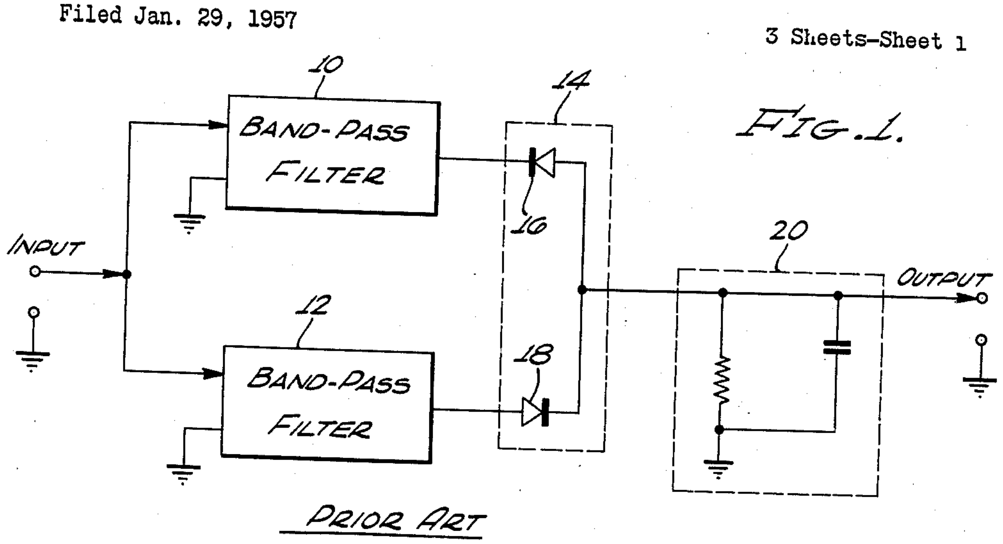
FIG. 1 is a schematic diagram of a frequency discriminator of the prior art.

In the drawing in FIG. 1 two bandpass filters 10 and 12 are shown connected respectively to a diode output circuit 14 including a diode 16 connected from filter 10 and a diode 18 connected from filter 12. It is to be noted that the diodes 16 and 18 are poled to be conducted in opposite directions. The output electrodes of each of the diodes 16 and 18 are connected together and to a smoothing circuit 20.

Figure 2:
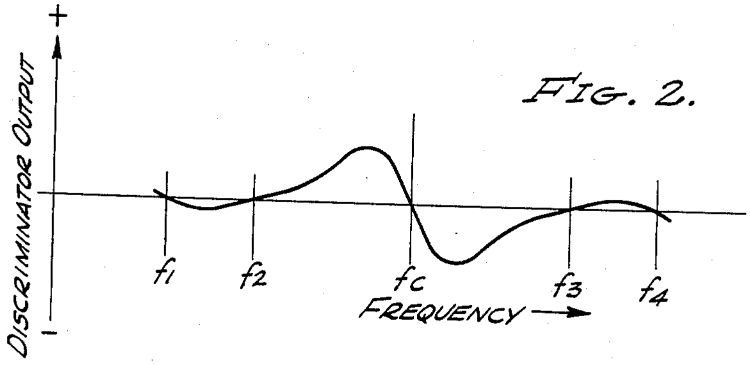
FIG. 2 is a graph of a typical output characteristic of the discriminator shown in FIG. 1.

In the operation of the discriminator shown in FIG. 1, several crossovers may be encountered. The response of the discriminator might be that indicated at 22 shown in FIG. 2. Crossovers may occur at frequencies $f_1$, $f_2$, $f_c$, $f_3$ and $f_4$, where $f_c$ is the design crossover of the discriminator. This characteristic may be produced by slight misalignment of each of the filters 10 and 12.

Figure 3:
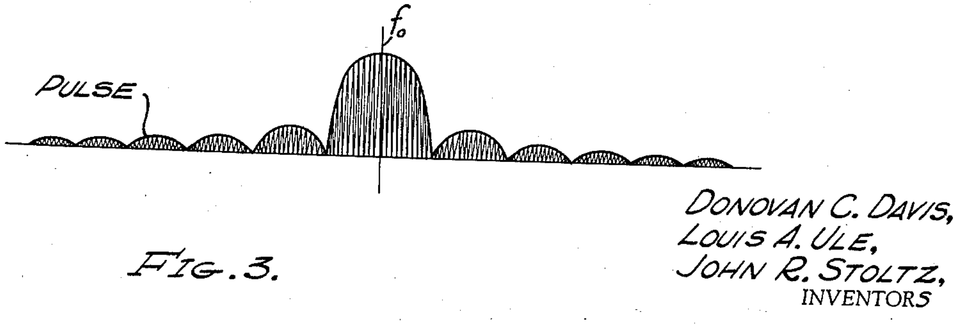
FIG. 3 is a graph of the power spectrum of a pulse modulated RF signal.

In addition, additional crossovers may be produced in pulse operation because during pulse operation the frequency spectrum of a pulse may be that as is indicated in FIG. 3 where $f_0$ is the fundamental carrier frequency of a pulse modulated wave.

Figure 4:
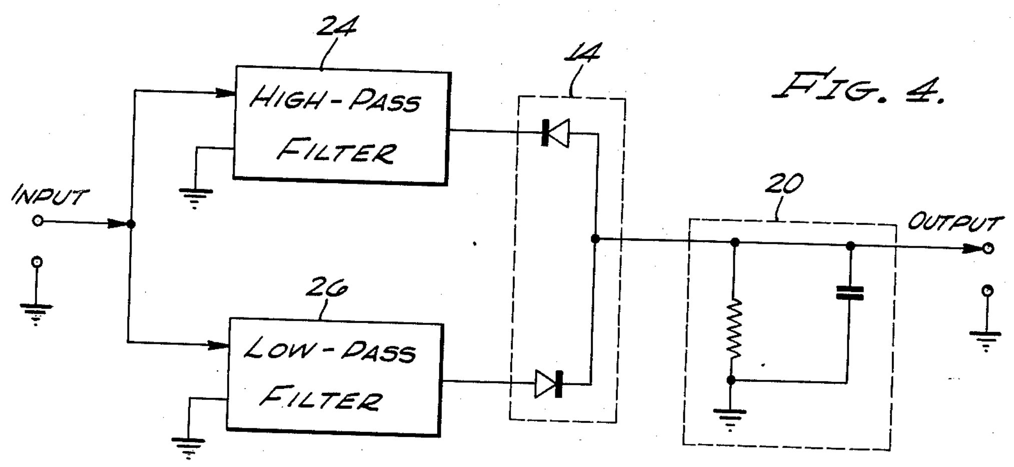
FIGS. 4 and 5 are schematic diagrams of two alternative embodiments of the invention.

The present invention overcomes both of these disadvantages of the prior art by providing a discriminator having only one crossover. An embodiment of the invention which may be employed to eliminate any crossovers except in the "designed" crossover is shown in FIG. 4. This discriminator comprises high and low pass filters 24 and 26 which are in turn connected to the same diode network 14 and smoothing circuit 20 shown in FIG. 4.

Figure 5:
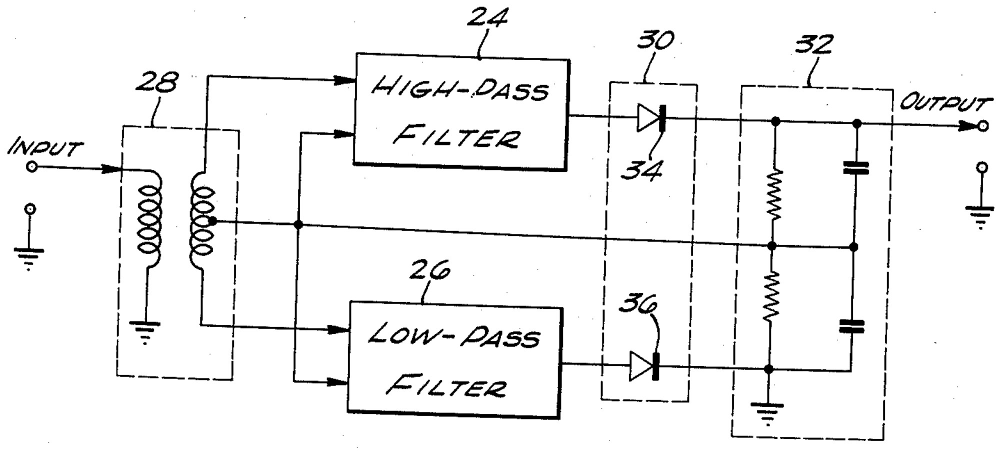

As shown in FIG. 5, if the phases of input signal to each of the filters 24 and 26 are reversed by transformer means 28 thereshown, the output may be passed through different rectifier and smoothing circuit means 30 and 32, the rectifier means 30 including two rectifiers 34 and 36 connected respectively from filters 24 and 26, but poled in the same direction.

Figure 7:
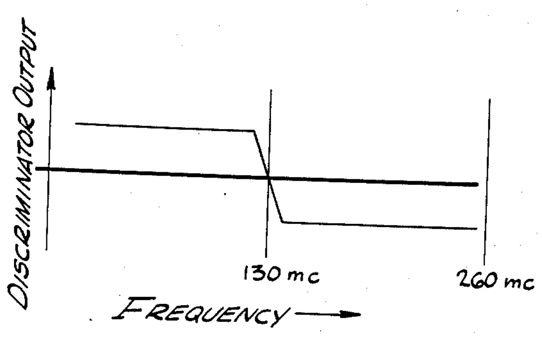
FIG. 7 is a graph of the frequency response of the discriminator shown in FIG. 6.
Figure 6:
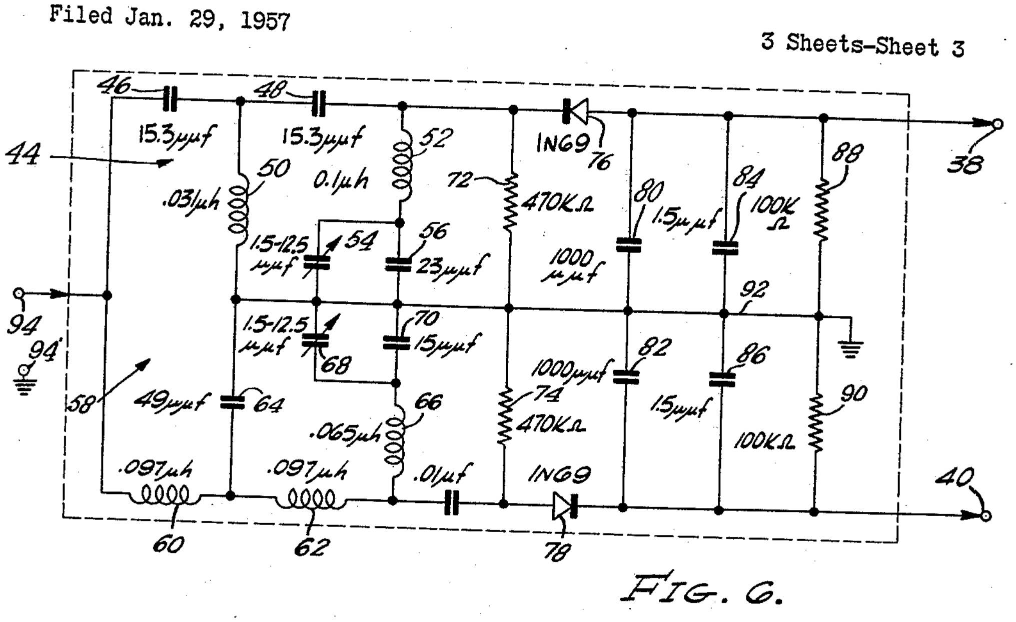
FIG. 6 is a detailed schematic diagram of another embodiment of the invention.

The discriminator shown in FIG. 6 is provided with output terminals 38 and 40, the voltages obtained at each being positive with respect to ground. When the discriminator is unbalanced in one direction, the voltage obtained at one of the terminals 38, 40 will be substantially greater than the voltage obtained at the other. This discriminator was designed for a 130 megacycle crossover. The sensitivity of the discriminator at the crossover frequency is a function of the input signal to noise ratio and the circuit element. For the 130 megacycle per second input, a sensitivity of 15 millivolts per megacycle at crossover was obtained. The output characteristic of the discriminator shown in FIG. 6 is shown in FIG. 7.

The discriminator of FIG. 6 includes a high pass filter 44 including serially connected capacitors 46 and 48 and parallel connected inductors 50 and 52. A pair of parallel connected capacitors 54 and 56 are connected from inductor 52 to ground. A low pass filter 58 is similarly provided with serially connected inductors 60 and 62 with a parallel connected capacitor 64 and a parallel connected inductor 66. A pair of capacitors 68 and 70 are then connected from inductor 66 to ground. Terminations are respectively provided for filters 44 and 58 by resistors 72 and 74 respectively. A diode 76 is connected from the upper end of resistor 72 and a diode 78 is connected from the lower end of resistor 74. Diode 76 is poled to be conductive in the direction to the left as viewed in FIG. 6 and diode 78 is poled to be conductive in the direction to the right. Smoothing capacitors 80 and 82 are connected respectively from the right hand side of diode 76 and the right hand side of diode 78 to ground. Additional smoothing capacitors 84 and 86 are respectively connected in parallel to capacitors 80 and 82. Smoothing resistors 88 and 90 are respectively connected in parallel with smoothing capacitors 84 and 86.

A central conductor 92 is grounded at the right end thereof as viewed in FIG. 6. The discriminator of FIG. 6 is provided with input terminals 94 and 94′, and output terminals 38 and 40, as stated previously.

Figure 8:
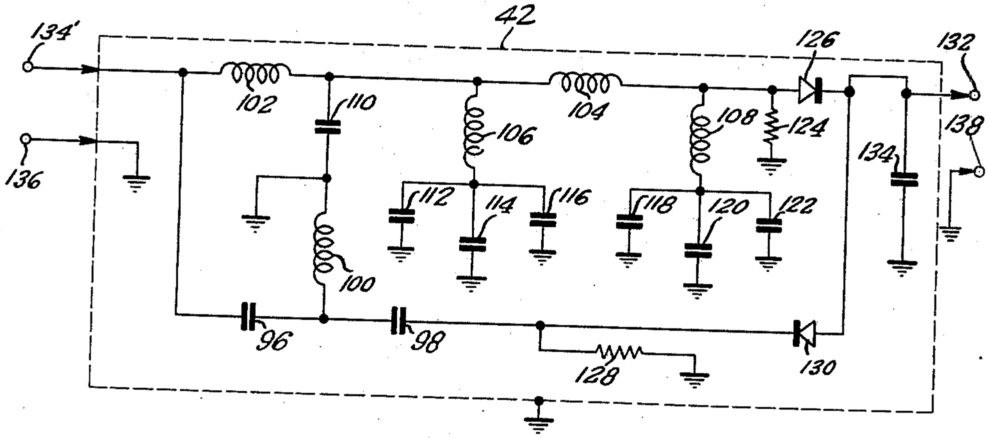
FIG. 8 is a detailed schematic diagram of still another embodiment of the invention.
Figure 9:
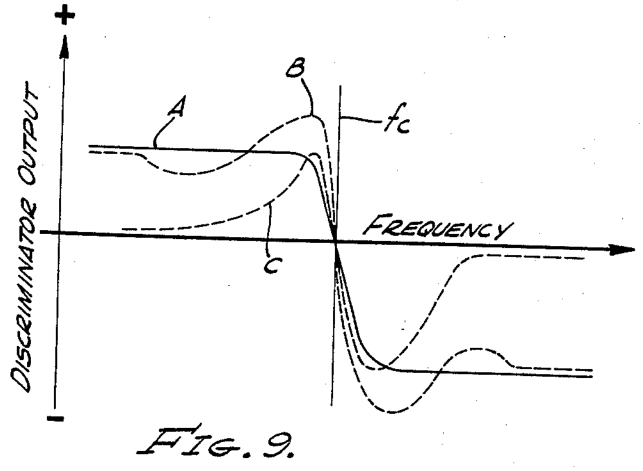
FIG. 9 is a graph of the output characteristic of the discriminator of FIG. 8 as compared to a conventional discriminator output characteristic.

A frequency discriminator 42 is shown in FIG. 8, which may be employed in an AFC circuit. A graph of a conventional discriminator output characteristic is indicated at C in FIG. 9. The output characteristic of the discriminator shown in FIG. 8 is indicated at A and B in FIG. 9. The characteristic A was found with a matched termination for each filter of, for example, 100 ohm resistors. The characteristic B was found for mismatched terminations of, for example, 1000 ohms, which is substantially greater than the 100 ohm characteristic impedances of each filter. It is to be noted that the output characteristic B does not create ambiguous crossovers although the discriminator sensitivity is increased at the design crossover $f_c$, sensitivity being the slope of the output characteristics at frequency $f=f_c$.

In FIG. 8 the high pass filter includes serially connected capacitors 96 and 98 and a parallel connected inductor 100. The low pass filter includes serially connected inductors 102 and 104, parallel connected inductors 106 and 108 and a parallel connected capacitor 110. Three parallel connected capacitors 112 and 114 and 116 are connected from inductor 106 to ground. Three parallel connected capacitors 118, 120 and 122 are connected from inductor 108 to ground.

A resistive termination including a resistor 124 is connected in parallel with the low pass filter from a terminal of a diode 126 to ground. A resistive termination including a resistor 128 is connected from a terminal of another diode 130 to ground. Diode 126 is poled to be conductive in a direction to the right as viewed in FIG. 8. Diode 130 is poled to be conductive in a direction to the left as viewed in FIG. 8. The right hand terminals of each of the diodes 126 and 130 are connected to an output terminal 132 from which a capacitor 134 is connected to ground.

Discriminator 42 is provided with a first input terminal 134′ and a second grounded input terminal 136. Discriminator 42 is also provided not only with first output 132 but also a grounded output terminal 138.

In the circuit of FIG. 6, all values are given microfarads, millihenries and ohms unless otherwise indicated. The circuit shown in FIG. 8 proved non-critical with a 50 millivolt input and a .5 microsecond pulse. A 7 kilocycle error was sufficient to operate an AFC servo motor. By taking appropriate but unnecessary design measures, this error could have been reduced to one kilocycle.

In both the circuits of FIGS. 6 and 8 *m*-derived terminations are used, but they need not necessarily be used. They may be designed to be Butterworth or Tchebyschev types. In any case, one type is not preferred over another.

Other changes and modifications in the invention will, of course, suggest themselves to those skilled in the art and the invention is by no means limited to the specific embodiments shown since they are shown merely for purpose of illustration, but the invention and its true scope is only defined in the appended claims.

What is claimed is:

1. A frequency discriminator comprising: a high-pass filter for attenuating an input signal substantially only when it has a frequency below a predetermined frequency; a low-pass filter for attenuating said input signal substantially only when it has a frequency above said predetermined frequency, both of said filters being provided with mismatched terminations connected directly in parallel with each corresponding filter; and means for combining the outputs of both of said filters to produce a direct-current voltage having a predetermined polarity when said input signal has a frequency above said predetermined frequency, and a polarity opposite said predetermined polarity when said input signal has a frequency below said predetermined frequency, each of said mismatched terminations being connected to the input of said combining means.

2. A frequency discriminator comprising: a high-pass filter for attentuating an input signal substantially only when it has a frequency below a predetermined frequency; a termination connected directly in parallel with said high-pass filter, said termination having an impedance substantially greater than its characteristic impedance; a low-pass filter for attenuating said input signal substantially only when it has a frequency above said predetermined frequency; a termination connected directly in parallel with said low-pass filter, said termination having an impedance substantially greater than its characteristic impedance; and means for combining the outputs of both of said filters to produce a direct-current voltage having a predetermined polarity when said input signal has a frequency above said predetermined frequency, and a polarity opposite said predetermined polarity when said input signal has a frequency below said predetermined frequency, said terminations being connected to the input of said combining means.

3. A frequency descriminator comprising: a high-pass filter for attenuating an input signal substantially only when it has a frequency below a predetermined frequency; a restrictive termination connected directly in parallel with said high-pass filter, said resistive termination having an impedance substantially greater than its characteristic impedance; a low-pass filter for attenuating said input signal substantially only when it has a frequency above said predetermined frequency; a resistive termination connected directly in parallel with said low-pass filter, said resistive termination having an impedance substantially greater than its characteristic impedance; and means for combining the outputs of both of said filters to produce a direct-current voltage having a predetermined polarity when said input signal has a frequency above said predetermined frequency, and a polarity opposite said predetermined polarity when said input signal has a frequency below said predetermined frequency, said resistive terminations being connected to the input of said combining means.

4. A frequency discriminator comprising: a high-pass filter for attenuating an input signal substantially only when it has a frequency below a predetermined frequency; a low-pass filter for attenuating said input signal substantially only when it has a frequency above said predetermined frequency; a resistive termination connected directly in parallel with each of said filters, said resistive terminations being of an impedance substantially greater than the characteristic impedances of said filters; a first rectifier connected from said high-pass filter and poled in one direction; a second rectifier connected from said low-pass filter and poled in the opposite direction, input electrodes of said rectifiers other than those connected to corresponding ones of said filters being connected together; and means connected from the junction of said rectifiers for producing a substantially constant direct-current voltage representing the average value of the voltage appearing at the junction of said rectifiers.

5. A frequency discriminator comprising: a high-pass filter for attenuating an input signal substantially only when it has a frequency below a predetermined frequency; a low-pass filter for attenuating said input signal substantially only when it has a frequency above said predetermined frequency; a resistive termination connected directly in parallel with said filters, said resistive termination being of an impedance substantially greater than their characteristic impedances; a rectifier connected from the outputs of each of said filters, said rectifiers being poled in the same direction and having input electrodes connected both to said filters and to said resistive termination; and means connected between output electrodes of said rectifiers for producing a substantially constant direct-current voltage having a predetermined polarity when said input signal has a frequency above said predetermined frequency, and a polarity opposite said predetermined polarity when the input signal has a frequency below said predetermined frequency.

6. A frequency discriminator comprising: a high-pass filter for attenuating an input signal substantially only when it has a frequency below a predetermined frequency; a low-pass filter for attenuating said input signal substantially only when it has a frequency above said predetermined frequency; a mismatched termination connected directly in parallel with each of said filters, said terminations being of a different order of magnitude than the characteristic impedances of said filters; and means for combining the outputs of both of said filters to produce a direct-current voltage having a predetermined polarity when said input signal has a frequency above said predetermined frequency, and a polarity opposite said predetermined polarity when said input signal has a frequency below said predetermined frequency, said terminations being connected to the input of said combining means.

7. A frequency discriminator comprising: a high-pass filter for attenuating an input signal substantially only when it has a frequency below a predetermined frequency; a low-pass filter for attenuating said input signal substantially only when it has a frequency above said predetermined frequency; a mismatched termination connected directly in parallel with each of said filters, said terminations being of a higher order of magnitude than the characteristic impedances of said filters; and means for combining the outputs of both of said filters to produce a direct-current voltage having a predetermined polarity when said input signal has a frequency above said predetermined frequency, and a polarity opposite said predetermined polarity when said input signal has a frequency below said predetermined frequency, said terminations being connected to the input of said combining means.

8. A frequency discriminator comprising: a high-pass filter for attenuating an input signal substantially only when it has a frequency below a predetermined frequency; a low-pass filter for attenuating said input signal substantially only when it has a frequency above said predetermined frequency; a mismatched termination connected directly in parallel with each of said filters, said terminations being about ten times as large as the characteristic impedances of said filters; and means for combining the outputs of both of said filters to produce a direct-current voltage having a predetermined polarity when said input signal has a frequency above said predetermined frequency, and a polarity opposite said predetermined polarity when said input signal has a frequency below said predetermined frequency, each of said mismatched terminations being connected to the input of said combining means.

9. A frequency discriminator comprising: a high-pass filter for attenuating an input signal substantially only when it has a frequency below a predetermined frequency; a low-pass filter for attenuating said input signal substantially only when it has a frequency above said predetermined frequency; a mismatched termination connected directly in parallel with each of said filters, said terminations being of a magnitude sufficiently large to produce a substantial increase in the rate of change of the output of said filters with respect to frequency at their crossover points over that which would be produced by terminating said filters in their characteristic impedances; and means for combining the outputs of both of said filters to produce a direct-current voltage having a predetermined polarity when said input signal has a frequency above said predetermined frequency, and a polarity opposite said predetermined polarity when said input signal has a frequency below said predetermined frequency, each of said mismatched terminations being connected to the input of said combining means.

10. A frequency discriminator comprising: a high-pass filter for attenuating an input signal substantially only when it has a frequency below a predetermined frequency; a low-pass filter for attenuating said input signal substantially only when it has a frequency above said predetermined frequency; a mismatched termination connected directly in parallel with each of said filters, said terminations being resistors having resistances of a higher order of magnitude than the characteristic impedances of said filters; and means for combining the outputs of both of said filters to produce a direct-current voltage having a predetermined polarity when said input signal has a frequency above said predetermined frequency, and a polarity opposite said predetermined polarity when said input signal has a frequency below said predetermined frequency, said mismatched terminations being connected to the input of said combining means.

References Cited in the file of this patent

UNITED STATES PATENTS

| | | |
|---|---|---|
| 2,138,341 | Crosby | Nov. 29, 1938 |
| 2,243,417 | Crosby | May 27, 1941 |
| 2,413,913 | Duke | Jan. 7, 1947 |
| 2,782,302 | Thom | Feb. 19, 1957 |

FOREIGN PATENTS

| | | |
|---|---|---|
| 615,536 | Great Britain | Jan. 7, 1949 |